United States Patent
Hironaka et al.

(10) Patent No.: US 9,700,849 B2
(45) Date of Patent: Jul. 11, 2017

(54) GAS SEPARATION MEMBRANE, GAS SEPARATION MODULE, GAS SEPARATION APPARATUS, AND GAS SEPARATION METHOD

(71) Applicant: FUJIFILM Corporation, Minato-Ku, Tokyo (JP)

(72) Inventors: Koji Hironaka, Kanagawa (JP); Ichiro Nagata, Kanagawa (JP); Satoshi Sano, Kanagawa (JP)

(73) Assignee: FUJIFILM Coporation, Tokyo (JP)

( * ) Notice: Subject to any disclaimer, the term of this patent is extended or adjusted under 35 U.S.C. 154(b) by 64 days.

(21) Appl. No.: 14/726,724

(22) Filed: Jun. 1, 2015

(65) Prior Publication Data
US 2015/0258505 A1    Sep. 17, 2015

Related U.S. Application Data

(63) Continuation of application No. PCT/JP2013/082147, filed on Nov. 29, 2013.

(30) Foreign Application Priority Data

Dec. 3, 2012   (JP) ................ 2012-264117

(51) Int. Cl.
*B01D 53/22*    (2006.01)
*B01D 69/12*    (2006.01)
(Continued)

(52) U.S. Cl.
CPC .......... *B01D 69/12* (2013.01); *B01D 53/22* (2013.01); *B01D 53/228* (2013.01); *B01D 63/00* (2013.01);
(Continued)

(58) Field of Classification Search
CPC  B01D 53/22; B01D 53/228; B01D 2053/221; B01D 63/00; B01D 69/02;
(Continued)

(56) References Cited

U.S. PATENT DOCUMENTS 5,034,026 A * 7/1991 Summers .............. B01D 71/62
                                                        95/47
5,409,524 A    4/1995 Jensvold et al.
(Continued)

FOREIGN PATENT DOCUMENTS

| JP | 1-159024 A | 6/1989 |
| JP | 5-506054 A | 9/1993 |

(Continued)

OTHER PUBLICATIONS

Yuri Yampolskii et al., "Membrane Gas Separation", 2010, xvii-xx, Johns Wiley & Sons Ltd.
(Continued)

*Primary Examiner* — Jason M Greene
(74) *Attorney, Agent, or Firm* — Sughrue Mion, PLLC (57) ABSTRACT

A gas separation membrane having a gas separating layer containing a polybenzoxazole resin, in which the polybenzoxazole exhibits a solubility of 1% by mass or more to any one solvent selected from tetrahydrofuran, chloroform, methyl ethyl ketone, and N-methylpyrrolidone, at a temperature of 30° C., a gas separation module utilizing the gas separation membrane, a gas separation apparatus, and a gas separation method.

9 Claims, 1 Drawing Sheet

(51) Int. Cl.
*B01D 63/00* (2006.01)
*B01D 71/58* (2006.01)
*B01D 71/62* (2006.01)
*C10L 3/10* (2006.01)
*B01D 69/02* (2006.01)
*B01D 69/10* (2006.01)
*C08G 73/22* (2006.01)

(52) U.S. Cl.
CPC ............. *B01D 69/02* (2013.01); *B01D 69/10* (2013.01); *B01D 71/58* (2013.01); *B01D 71/62* (2013.01); *C08G 73/22* (2013.01); *C10L 3/104* (2013.01); *B01D 2053/221* (2013.01); *B01D 2256/245* (2013.01); *B01D 2257/504* (2013.01); *B01D 2325/24* (2013.01); *B01D 2325/28* (2013.01); *B01D 2325/30* (2013.01); *C10L 2290/548* (2013.01); *Y02C 10/10* (2013.01); *Y02C 20/20* (2013.01); *Y02P 20/152* (2015.11)

(58) Field of Classification Search
CPC ........ B01D 69/10; B01D 69/12; B01D 71/58; B01D 71/62; B01D 2257/504; B01D 2325/24; B01D 2325/28; B01D 2325/30; C08G 73/22; C10L 3/104; C10L 2290/548

See application file for complete search history.

(56) References Cited

U.S. PATENT DOCUMENTS

| | | | |
|---|---|---|---|
| 5,837,032 A * | 11/1998 | Moll | B01D 53/22 95/45 |
| 5,928,410 A * | 7/1999 | Jois | B01D 53/228 55/DIG. 5 |
| 2005/0156356 A1* | 7/2005 | Saitoh | C08G 73/22 264/435 |
| 2009/0277327 A1 | 11/2009 | Zhou et al. | |
| 2011/0072973 A1* | 3/2011 | Liu | B01D 53/228 96/10 |
| 2011/0094379 A1* | 4/2011 | Cordatos | B01D 53/228 95/51 |
| 2015/0033945 A1 | 2/2015 | Yamada et al. | |

FOREIGN PATENT DOCUMENTS

| | | |
|---|---|---|
| JP | 08-503655 A | 4/1996 |
| JP | 2000-042342 A | 2/2000 |
| JP | 2006-299021 A | 11/2006 |
| JP | 2007-246772 A | 9/2007 |
| JP | 2007-297605 A | 11/2007 |
| JP | 2010-514848 A | 5/2010 |
| JP | 2012-066239 A | 4/2012 |
| JP | 2012-521871 A | 9/2012 |
| WO | 2013/111732 A1 | 8/2013 |

OTHER PUBLICATIONS

Richard W. Baker et al., "Natural Gas Processing with Membranes: An Overview", Ind. Eng. Chem Res., 2008, pp. 2109-2121, vol. 47.
Richard W. Baker, "Future Directions of Membrane Gas Separation Technology", Ind. Eng. Chem. Res., 2002, pp. 1393-1411, vol. 41.
International Search Report for PCT/JP2013/082147 dated Feb. 18, 2014.
Communication dated Apr. 5, 2016 from the Japanese Patent Office in counterpart application No. 2012-264117.
Joseph et al., "Synthesis and characterization of fluorinated polybenzoxazoles via solution cyclization techniques," Department of Chemistry and NSF Science and Technology Center: High Performance Polymeric Adhesives and Composites, Polymer, vol. 35, No. 23, 1994, pp. 5046-5050.
Okamoto et al., "Gas Permeability and Permselectivity of Fluorinated Polymebzoxazoles," Department of Advanced Materials Science and Engineering, Faculty of Engineering, Journal of Polymer Science: Part B: Polymer Physics, vol. 30, 1215-1221 (1992).

* cited by examiner

GAS SEPARATION MEMBRANE, GAS SEPARATION MODULE, GAS SEPARATION APPARATUS, AND GAS SEPARATION METHOD

CROSS-REFERENCE TO RELATED APPLICATIONS

This application is a Continuation of PCT International Application No. PCT/JP2013/082147 filed on Nov. 29, 2013, which claims priority under 35 U.S.C. §119 (a) to Japanese Patent Application No. 2012-264117 filed in Japan on Dec. 3, 2012 Each of the above applications is hereby expressly incorporated by reference, in its entirety, into the present application.

TECHNICAL FIELD

The present invention relates to a gas separation membrane, a gas separation module utilizing thereof, a gas separation apparatus utilizing thereof, and a gas separation method.

BACKGROUND ART

A raw material comprising a polymer compound has characteristic gas permeability for each raw material. Based on properties thereof, a desired gas component can be separated by allowing selective permeation, by means of a membrane constituted of a specific polymer compound. As an industrial application embodiment of this gas separation membrane, study has been conducted for separating and recovering carbon dioxide from a large-scale carbon dioxide source, in a thermal power station, a cement plant, a blast furnace in a steel plant or the like, in relation to a global warming issue. Then, this membrane separation technique attracts attention as a solution to an environmental issue to allow achievement by relatively small energy. Meanwhile, natural gas or bio gas (gases generated by fermentation and anaerobic digestion of excreta of organisms, organic fertilizers, biodegradable substances, polluted water, garbages, energy crops, and the like) is mainly a mixed gas of methane and carbon dioxide. Study has been made so far for a membrane separation method as a means for removing an impurity, such as carbon dioxide therein (Patent Literature 1).

In regard to the purification of natural gas according to the membrane separation method, celluloses and polyimides have been studied as the materials for the membrane for use in the membrane separation method. However, due to the high pressure conditions in actual industrial plants, the influence of impurities present in natural gas, and the like, the membrane is plasticized, and there has been a problem of a lowering in separation selectivity attributable to that (pages 313-322 of Non-Patent Literature 1, and Non-Patent Literatures 2 and 3). It has also been investigated to use polybenzoxazole (hereinafter, abbreviated to PBO), as a material which can exhibit higher durability (Patent Literature 2).

In Patent Literature 2, it is described that a membrane of PBO is obtained by forming a membrane using a particular polyimide as a precursor of PBO, and subjecting this membrane to a heat treatment at 400° C. or higher. It is also described that the resultant PBO membrane has superior permeability to carbon dioxide and gas permeation selectivity than a polyimide membrane before the heat treatment. Furthermore, it is described that as the temperature of the heat treatment is higher, permeability of carbon dioxide is enhanced.

CITATION LIST

Patent Literatures

Patent Literature 1: JP-A-2007-297605 ("JP-A" means unexamined published Japanese patent application)
Patent Literature 2: U.S. Patent Application Publication No. 2009/0277327 A

Non-Patent Literatures

Non-Patent Literature 1: Yuri Yampolskii, Benny Freeman, Membrane Gas Separation, 2010, Johns Wiley & Sons Ltd.
Non-Patent Literature 2: Industrial & Engineering Chemistry Research, 2008, 47, 2109
Non-Patent Literature 3: Industrial & Engineering Chemistry Research, 2002, 41, 1393

SUMMARY OF THE INVENTION

Technical Problem

However, in order to obtain a practically useful gas separation membrane, sufficient gas permeability and separation performance should be secured by making the gas separating layer into a thin layer. Thus, in the case where the gas separation membrane is an asymmetric membrane, it is required to make the portion that contributes to separation into a thin layer called a skin layer, and in regard to a gas separation composite membrane which includes a gas separating layer on a gas permeable support (layer), it is important to make the relevant gas separating layer into a thin layer.

As described above, it is known that the PBO membrane, obtainable by subjecting a PBO precursor to condensation and rearrangement at a high temperature, has excellent gas separation performance. However, the PBO obtained through a high temperature treatment has low solubility in a low-boiling-point solvent, and a solution for membrane formation (dope solution) cannot be prepared. Thus, in order to form a high performance gas separating layer formed from a thin membrane of PBO, as described in Patent Literature 2, a membrane is formed by using a solution of a highly soluble PBO precursor, and then this is converted to PBO by a high temperature treatment. However, a gas separation membrane that can be produced by this technique is in the form of a simple single membrane or in the form of an asymmetric membrane. In the case of a composite membrane, the use is limited to the case of employing an ultrahigh heat resistant material for the support of the gas separation membrane, which is not practical.

It is a task of the present invention to provide a gas separation membrane, which can have increased gas permeability and gas separation selectivity while using PBO that exhibits predetermined solubility in a low-boiling-point solvent, and which has both satisfactory mechanical strength and satisfactory durability. It is another task of the invention to provide a gas separation module using the gas separation membrane, a gas separation apparatus, and a gas separation method.

In view of the problems described above, the inventors of the present invention conducted thorough investigations. As a result, the inventors found that when PBO is synthesized at a lower temperature by employing a method which does not involve a thermal rearrangement step, solubility in a low-boiling-point solvent is enhanced, and that when a low-boiling-point solvent solution containing the relevant PBO dissolved therein is used, a thin layer containing PBO can be formed. Furthermore, a gas separation membrane having a gas separating layer formed by using the low-boiling-point solvent solution of PBO described above was produced, and surprisingly, it was found that this gas separation membrane has excellent gas permeability and gas separation selectivity and also has both satisfactory mechanical strength and satisfactory durability.

The present invention was completed based on these findings.

The tasks described above were achieved by the following means.

<1> A gas separation membrane having a gas separating layer containing a polybenzoxazole resin, in which the polybenzoxazole exhibits a solubility of 1% by mass or more to any one solvent selected from tetrahydrofuran, chloroform, methyl ethyl ketone, and N-methylpyrrolidone, at a temperature of 30° C.

<2> The gas separation membrane according to the item <1>, wherein the gas separating layer is formed using a solution of the polybenzoxazole resin.

<3> The gas separation membrane according to the item <1> or <2>, wherein the gas separation membrane is a gas separation composite membrane having the gas separating layer above a gas permeable supporting layer.

<4> The gas separation membrane according to any one of the items <1> to <3>, wherein the polybenzoxazole resin has a repeating unit represented by formula (I):

(I)

wherein, in formula (I), $R^a$ represents a group having a structure represented by any one of formulas (I-a) to (I-d); $X^1$ represents a single bond or a divalent linking group; $R^1$ and $R^2$ each represent a hydrogen atom or an alkyl group; and symbol * represents a bonding site with N or O indicated in formula (I), (I-a)

(I-b)

(I-c)

(I-d)

wherein, in formula (I), $R^b$ represents any one of formulas (II-a), (II-b), (III-a) and (III-b), Formula (II-a)

Formula (II-b)

wherein $R^3$ represents an alkyl group or a halogen atom; $R^4$ and $R^5$ each represent an alkyl group or a halogen atom, or are linked to each other to represent a ring-forming group together with $X^2$; l1, m1 and n1 each represent an integer from 0 to 4; and $X^2$ represents a single bond or a divalent linking group, Formula (III-a)

Formula (III-b)

wherein $R^6$, $R^7$, and $R^8$ each represent a substituent; $J^1$ represents a single bond or a divalent linking group; l2, m2, and n2 each represent an integer from 0 to 3; $A^1$ represents a group selected from —COOH, —OH, —SH, —S(=O)$_2$R', and —S(=O)$_2$OH; R' represents an alkyl group; and $X^3$ represents a single bond or a divalent linking group.

<5> The gas separation membrane according to any one of the items <1> to <4>, wherein in the case where the gas to be subjected to separation is a mixed gas of carbon dioxide and methane, a permeation rate of carbon dioxide at 35° C. and 5 atmospheres is more than 20 GPU, and a ratio of the permeation rates of carbon dioxide and methane ($R_{CO2}/R_{CH4}$) is 15 or higher.

<6> The gas separation membrane according to any one of the items <3> to <5>, wherein the supporting layer includes a porous layer on the gas separating layer side and a nonwoven fabric layer on the opposite side.

<7> The gas separation membrane according to the item <6>, wherein a cut-off molecular weight of the porous layer is 100,000 or less.

<8> The gas separation membrane according to any one of the items <1> to <7>, wherein the gas separation membrane is used to selectively permeate carbon dioxide from a gas containing carbon dioxide and methane.

<9> A gas separation module having the gas separation membrane according to any one of the items <1> to <8>.

<10> A gas separation apparatus having the gas separation module according to the item <9>.

<11> A method of separating a gas, the method containing selectively causing carbon dioxide to permeate from a gas containing carbon dioxide and methane, using the gas separation membrane according to any one of the items <1> to <8>.

In the present specification, when there are a plurality of substituents, linking groups and the like (hereinafter, referred to as substituents and the like), which are denoted by particular symbols, or when the plurality of substituents and the like are defined simultaneously or selectively, it is noted that the respective substituents and the like may be identical with or different from each other. Furthermore, even if not particularly specified otherwise, it is noted that when the plurality of substituents and the like are adjacent or adjoining, those substituents and the like may be linked or condensed together, to form a ring.

In regard to the denotation of compounds (containing resins) in the present specification, the denotation of a compound is used to mean the relevant compound itself as well as a salt thereof and an ion thereof. Furthermore, the denotation is meant to include a structure in which a predetermined portion has been modified, to the extent that the desired effects are provided.

In regard to a substituent (the same also applies to a linking group) for which it is not described in the present specification on whether the substituent is substituted or unsubstituted, it is meant that the group may have an arbitrary substituent, to the extent that the desired effects are provided. The same also applies to a compound for which it is not described whether the compound is substituted or unsubstituted.

When a substituent is mentioned in the present specification, unless particularly specified otherwise, the group of substituents Z described below is designated as a preferred scope of the substituent.

In the present specification, "benzoxazole" is used to mean to include benzobisoxazole.

The gas separation membrane of the present invention is obtained by forming a gas separating layer using a solution of PBO having high solubility to a low-boiling-point solvent. Thus, it is not necessary to form a PBO membrane that is in charge of the gas separation function, by means of thermal rearrangement, and the PBO membrane can be formed at a lower temperature. Furthermore, since this PBO membrane has excellent mechanical strength and is also not easily plasticized even at a high pressure and in the presence of plasticizing impurities, the PBO membrane exhibits excellent gas permeability and high gas separation selectivity, while at the same time, deterioration thereof is suppressed.

Furthermore, according to the method of producing a gas separation membrane of the present invention, since PBO having high solubility to a low-boiling-point solvent is used for the formation of the gas separating layer, a gas separation membrane having the gas separating layer in a state of a thinner membrane can be obtained even if a high temperature treatment is not applied to.

Other and further features and advantages of the invention will appear more fully from the following description, appropriately referring to the accompanying drawings.

MODE FOR CARRYING OUT THE INVENTION

Hereinafter, the present invention will be described in detail.

In regard to the gas separation membrane of the present invention, for the production of the gas separating layer, PBO that exhibits particular solubility to a particular low-boiling-point solvent is used. There are no particularly limitations on the form of the gas separation membrane of the present invention, and the gas separation membrane may be a composite membrane or may be an asymmetric membrane, as long as a gas separating layer is formed using PBO having solubility at a predetermined level or higher to the above-described low-boiling-point solvent. When the mechanical strength, production efficiency, accuracy, gas permeation performance and the like of the gas separation membrane are comprehensively taken into consideration, a gas separation composite membrane has superior practical usability.

[Gas Separation Membrane]
<Asymmetric Membrane>

A gas separation membrane formed from an asymmetric membrane can be formed by a phase inversion method. The phase inversion method is a known method of forming a membrane while inducing phase inversion by bringing a polymer solution into contact with a solidifying liquid. In the present invention, a so-called dry-and-wet method is suitably used. The dry-and-wet method is a method of forming a thin compact layer by evaporating the solution at the surface of a polymer solution formed into a membrane shape, then immersing the compact layer in a solidifying liquid (a solvent which is compatible with the solvent of the polymer solution but in which the polymer is insoluble), forming fine pores by utilizing the phase separation phenomenon occurring at that time, and thereby forming a porous layer. The dry-and-wet method was proposed by Loeb and Sourirajan (for example, U.S. Pat. No. 3,133,132).

In regard to the asymmetric gas separation membrane of the present invention, the thickness of the surface layer that contributes to gas separation and is called a compact layer or a skin layer, is not particularly limited. From the viewpoint of imparting practical gas permeability, the thickness is preferably 0.01 to 5.0 μm, and more preferably 0.05 to 1.0 μm. On the other hand, a porous layer that is disposed below the compact layer plays the role of lowering the resistance of gas permeability and also imparting mechanical strength. The thickness of the porous layer is not particularly limited as long as self-standing property as an asymmetric membrane is imparted. The thickness of the porous layer is preferably 5 to 500 μm, more preferably 5 to 200 μm, and even more preferably 5 to 100 μM.

The asymmetric gas separation membrane of the present invention may be a flat membrane, or may be a hollow fiber membrane. An asymmetric hollow fiber membrane can be produced by a dry-and-wet spinning method. The dry-and-wet spinning method is a method of producing an asymmetric hollow fiber membrane by applying the dry-and-wet method to a polymer solution that has acquired an intended shape of hollow fibers by being discharged through spinning nozzles. More specifically, the dry-and-wet spinning method is a method of producing a separation membrane by discharging a polymer solution through nozzles into an intended shape of hollow fibers, passing the polymer solution in the air or a nitrogen gas atmosphere immediately after discharge, then immersing the polymer solution in a solidifying liquid which does not substantially dissolve the polymer but has compatibility with the solvent of the polymer solution, to thereby form an asymmetric structure, then drying the resultant structure, and further heat treating the resultant-dried structure as necessary.

The solution viscosity of the PBO resin solution to be discharged through nozzles is preferably 2 to 17,000 Pa·s, more preferably 10 to 1,500 Pa·s, and particularly preferably 20 to 1,000 Pa·s, at the discharge temperature (for example, 10° C.), because the shape after discharging, such as a hollow fiber shape, can be obtained stably. Immersion in a solidifying liquid is preferably carried out such that the PBO resin solution is immersed in a primary solidifying liquid to be solidified to the extent that the shape of the membrane, such as a hollow fiber shape, can be maintained, then the membrane is wound around a guide roll, and then the membrane is immersed in a secondary solidifying liquid to sufficiently solidify the entire membrane. It is efficient to perform drying of the solidified membrane after the solidifying liquid is replaced with a solvent, such as a hydrocarbon. The heat treatment for drying is preferably carried out at a temperature lower than the softening point or the secondary transition point of the PBO resin to be used.

Regarding the asymmetric gas separation membrane of the present invention, the tensile strength is preferably 10 N/mm$^2$ or more, and more preferably 12 N/mm$^2$ or more, in order to further enhance the mechanical strength. There are no particular limitations on the upper limit of the tensile strength. The tensile strength is usually 25 N/mm$^2$ or less, and may be 20 N/mm$^2$ or less. Furthermore, the compressive strength of the asymmetric gas separation membrane of the present invention is preferably 10 MPa or more, and more preferably 15 MPa or more. There are no particular limitations on the upper limit of the compressive strength. The compressive strength is usually 50 MPa or less, and may be 40 MPa or less.

In order to impart appropriate flexibility together with the mechanical strength to the asymmetric gas separation membrane of the present invention, the elongation at breakage of the asymmetric gas separation membrane of the present invention is preferably 12% or more, and more preferably 16% or more. There are no particular limitations on the upper limit of the elongation at breakage. The elongation at breakage is usually 25% or less, and may be 20% or less. Also, from the same viewpoint, the tensile modulus of the asymmetric gas separation membrane of the present invention is preferably 100 MPa or less, more preferably 90 MPa or less, and even more preferably 80 MPa or less. In order to achieve a balance with mechanical strength, the lower limit of the tensile modulus is usually 10 MPa or more, may be 20 MPa or more, may be 30 MPa or more, or can also be 40 MPa or more.

<Composite Membrane>

The gas separation composite membrane of the present invention has, above a gas permeable supporting layer (support), a gas separating layer containing a particular PBO resin formed the above side. This composite membrane is preferably formed by coating (the term "coating" herein includes an embodiment in which the coating liquid is attached on the surface by dipping) a coating liquid (dope) to form the above-described gas separating layer, at least on a surface of a porous support.

Figure 1:
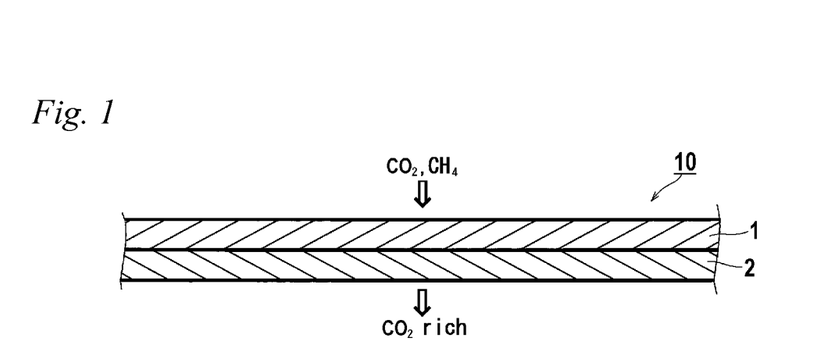
FIG. 1 is a cross-sectional diagram schematically illustrating an embodiment of the gas separation membrane of the present invention.
Figure 2:
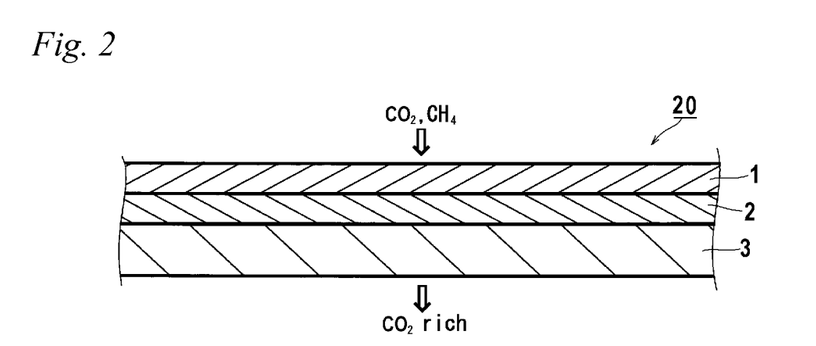
FIG. 2 is a cross-sectional diagram schematically illustrating another embodiment of the gas separation membrane of the present invention.

FIG. 1 is a vertical cross-sectional diagram schematically illustrating the gas separation composite membrane 10, which is a preferred embodiment of the present invention. The reference sign 1 is a gas separating layer and the reference sign 2 is a supporting layer constituted of a porous layer. FIG. 2 is a cross-sectional view schematically showing a gas separation composite membrane 20, being another preferred embodiment of the present invention. In this embodiment, in addition to the gas separating layer 1 and the porous layer 2, a nonwoven fabric layer 3 is added as the supporting layer.

The term "above a supporting layer" as used in the present specification means that there may be another layer interposed between the supporting layer and the gas separating layer. In addition, unless otherwise specified, with regard to expressions "above" and "under", a direction in which a gas to be separated is supplied is referred to as "above", and a direction from which a separated gas is discharged is referred to "under".

The gas separation composite membrane according to the present invention may have the gas separating layer formed and arranged on the surface or inside of the porous support. The gas separating layer is formed at least on the surface, and thus the composite membrane can be simply realized. Formation of the gas separating layer at least on the surface of the porous support allows realization of a composite membrane having advantages of high separation selectivity, high gas permeability and also mechanical strength. Regarding the membrane thickness of the separating layer, the membrane is preferably as thin as possible under conditions to provide superior gas permeability while maintaining mechanical strength and separation selectivity.

The thickness of the gas separating layer of the gas separation composite membrane according to the present invention is not particularly limited, but is preferably from 0.01 to 5.0 µm, and more preferably from 0.05 to 2.0 µm.

The porous support (porous layer) preferably applied for the supporting layer is not particularly limited so long as it satisfies mechanical strength and high gas permeability, may be a porous membrane made of any organic or inorganic substance and is preferably an organic polymer porous membrane. The thickness thereof is preferably from 1 to 3,000 µm, more preferably from 5 to 500 µm, and further preferably from 5 to 150 µm. Regarding the fine pore structure of this porous membrane, a mean pore diameter is ordinarily 10 µm or less, preferably 0.5 µm or less, and more preferably 0.2 µm or less, and a porosity is preferably from 20% to 90%, and more preferably from 30% to 80%. Further, the cut-off molecular weight of the porous layer is preferably 100,000 or less, and further the gas permeability is preferably $3\times10^{-5}$ cm$^3$ (STP)/cm$^2$·sec·cmHg (30 GPU) or more as the permeation rate of carbon dioxide, at 35° C. and 5 atmospheres. Examples of the material for the porous membrane include conventionally known polymers, including polyolefin-based resins, such as polyethylene and polypropylene; fluorine-containing resins, such as polytetrafluoroethylene, polyvinyl fluoride, and polyvinylidene fluoride;

and various resins, such as polystyrene, cellulose acetate, polyurethane, polyacrylonitrile, polyphenyleneoxide, polysulfone, polyethersulfone, polyimide and polyaramide. The shape of the porous membrane may be any of plate, spiral, tubular or hollow fibers.

In regard to the composite membrane of the present invention, it is preferable that a support is formed below the supporting layer on which the gas separating layer is formed, in order to further impart mechanical strength. Specific examples of such a support include a woven fabric, a nonwoven fabric and a net, and a nonwoven fabric is preferably used in view of membrane-forming property and costs. As the nonwoven fabric, fibers formed of polyester, polypropylene, polyacrylonitrile, polyethylene, polyamide or the like may be used alone or in combination with a plurality of fibers. The nonwoven fabric can be produced, for example, by paper-making of main fibers and binder fibers that are uniformly dispersed in water, using a cylinder mold, a fourdrinier or the like, and drying the resultant product by a drier. Moreover, the nonwoven fabric is preferably interposed between two rolls and subjected to pressure-heating, for the purpose of removing fluff or improving mechanical properties.

Preferably, the method of producing a composite membrane of the present invention is preferably a production method including the processes of applying a coating liquid containing the PBO resin that will be described below, and forming a gas separating layer. The content of the PBO resin in the coating liquid is not particularly limited. The content is preferably 0.1 to 30% by mass, and more preferably 0.5 to 10% by mass. If the content of the PBO resin is too low, when a membrane is produced on the porous support, the PBO resin easily penetrates into the lower layer, and thus, there is a high possibility that defects may occur in the surface layer that contributes to separation. Also, if the content of the PBO resin is too high, when a membrane is produced on a porous support, the PBO resin is filled at a high concentration in the pores, and there is a possibility that permeability may be lowered. The gas separation membrane according to the present invention can be suitably produced by adjusting the molecular weight, structure and the composition of the polymer in the separating layer, and also solution viscosity of the polymer.

As medium of the coating liquid, the organic solvent is not particularly limited, and specific examples include hydrocarbon-based organic solvents, such as n-hexane and n-heptane; ester-based organic solvents, such as methyl acetate, ethyl acetate, and butyl acetate; lower alcohols, such as methanol, ethanol, n-propanol, isopropanol, n-butanol, isobutanol and tert-butanol; aliphatic ketones, such as acetone, methyl ethyl ketone, methyl isobutyl ketone, diacetone alcohol, cyclopentanone, and cyclohexanone; ether-based organic solvents, such as ethylene glycol, diethylene glycol, triethylene glycol, glycerin, propylene glycol, ethylene glycol monomethyl or monoethyl ether, propylene glycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, dibutyl ether, tetrahydrofuran, methyl cyclopentyl ether, and dioxane; N-methylpyrrolidone, 2-pyrrolidone, dimethylformamide, dimethyl imidazolidinone, dimethyl sulfoxide, dimethyl acetamide and the like. These organic solvents are suitably selected within the range in which the solvents do not exert a harmful influence, such as corrosion of the support, and preferably an ester-based solvent (preferably butyl acetate), an alcohol-based solvent (preferably methanol, ethanol, isopropanol, and isobutanol), aliphatic ketones (preferably methyl ethyl ketone, methyl isobutyl ketone, diacetone alcohol, cyclopentanone, and cyclohexanone) or an ether-based solvent (e.g., ethylene glycol, diethylene glycol monomethyl ether, and methyl cyclopentylether); and further preferably an aliphatic ketone-based solvent, an alcohol-based solvent or an ether-based solvent. These solvents may be used alone or in combination of two or more types.

<Usage and Separation Capacity>

The gas separation membrane (asymmetric membrane and composite membrane) of the present invention can be suitably used in gas separation collection and gas separation purification. For example, the gas separating membrane can be processed into a gas separation membrane that can efficiently separate a specific gas from a gaseous mixture containing hydrogen, helium, carbon monoxide, carbon dioxide, hydrogen sulfide, oxygen, nitrogen, ammonia, sulfur oxide, nitrogen oxide, a hydrocarbon, such as methane and ethane, an unsaturated hydrocarbon, such as propylene, or a gas of a perfluoro compound, such as tetrafluoroethane. In particular, the gas separating membrane is preferably processed into a gas separation membrane for selectively separating carbon dioxide from a gaseous mixture containing carbon dioxide/hydrocarbon (methane).

Particularly, in the case where the gas to be separated is a mixed gas of carbon dioxide and methane, the permeation rate of carbon dioxide at 35° C. and 5 atmospheres is preferably more than 20 GPU, more preferably 20 to 300 GPU, and even more preferably 22 to 100 GPU. The ratio of the permeation rates of carbon dioxide and methane ($R_{CO2}/R_{CH4}$) is preferably 15 or more, more preferably 20 or more, even more preferably 20 to 60, and still more preferably 22 to 60. Meanwhile, $R_{CO2}$ represents the permeation rate of carbon dioxide, and $R_{CH4}$ represents the permeation rate of methane.

Meanwhile, 1 GPU is $1\times10^{-6}$ cm$^3$ (STP)/cm$^2$·sec·cmHg.

The mechanism of dissolution and diffusion to the membrane is thought to be involved in the above-described selective gas permeation. Study has been made for a separation membrane containing a polyethyleneoxy (PEO) composition by taking an advantage of such a viewpoint (see Journal of Membrane Science, 1999, 160, 87-99). This results from strong interaction of carbon dioxide with the polyethyleneoxy composition. This polyethyleneoxy membrane is a flexible and rubbery polymer membrane having a low glass transition temperature, and thus a difference of diffusion coefficients depending on gas species is small, and separation selectivity is mainly caused due to an effect of a difference in solubility. In contrast, in the composite membrane of the present invention, the glass transition temperature of the PBO resin applied thereto is high, and a large improvement can be made even from the viewpoint of thermal durability of the membrane while exhibiting the dissolution/diffusion action.

<Polybenzoxazole Resin>

The PBO resin that can be used in the present invention is explained in detail below.

The PBO resin that can be used in the present invention is not particularly limited as long as it is a polymer which contains a repeating unit having a benzoxazole ring and has a solubility of 1% by mass or more to any one of tetrahydrofuran, chloroform, methyl ethyl ketone, and N-methylpyrrolidone at 30° C. Preferably, the solubility to any one of tetrahydrofuran, chloroform, methyl ethyl ketone, and N-methylpyrrolidone at 30° C. is 1.5% to 50% by mass, and more preferably 2% to 30% by mass. A preferred embodiment of the PBO resin that can be used in the present invention is explained below.

It is preferable that the PBO resin that can be used in the present invention has a repeating unit represented by formula (I).

(I)

In formula (I), $R^a$ represents a group having a structure represented by any one of formulas (I-a) to (I-d). In formulas (I-a) to (I-d), symbol * represents a bonding site to N or O shown in formula (I). $R^a$ is preferably a group having a structure represented by formula (I-a) or (I-d), and more preferably a group having a structure represented by formula (I-d).

(I-a)

(I-b)

(I-c)

(I-d)

In formula (I), $R^b$ represents any one of formulas (II-a), (II-b), (III-a), and (III-b).

Formula (II-a)

Formula (II-b)

Formula (III-a)

Formula (III-b)

The PBO resin that can be used in the present invention may contain a repeating unit other than the repeating unit of formula (I), and when the number of moles of various repeating units represented by formula (I) is designated as 100, the number of moles of the other repeating units is preferably 20 or less, and more preferably 0 to 10. It is particularly preferable that the PBO resin that can be used in the present invention is composed only of the various repeating units represented by formula (I). Symbols in the formulas are explained below.

$X^1$, $X^2$, $X^3$ $X^1$, $X^2$ and $X^3$ each represent a single bond or a divalent linking group. The relevant divalent linking group is preferably —C($R^x$)$_2$— (wherein Rx represents a hydrogen atom or a substituent; when Rx is a substituent, these substituents may be linked to each other to form a ring), —O—, —SO$_2$—, —C(=O)—, —S—, —NR$^Y$— (wherein R$^Y$ represents a hydrogen atom, an alkyl group (preferably, a methyl group or an ethyl group), or an aryl group (preferably, a phenyl group)), or a combination thereof, and more preferably a single bond or —C($R^x$)$_2$—. When $R^x$ represents a substituent, specific examples thereof include the group of substituents Z described below, and among them, an alkyl group (a preferred range is the same as the group of substituents Z described below) is preferred, an alkyl group having a halogen atom as a substituent is more preferred, while trifluoromethyl is particularly preferred.

$R^1$, $R^2$ $R^1$ and $R^2$ each represent a hydrogen atom or an alkyl group. Preferred examples of the relevant alkyl group are the same as the preferred range of the alkyl group defined by the group of substituents Z described below, and among them, the alkyl group is preferably a methyl group.

$R^3$ $R^3$ represents an alkyl group, an amino group or a halogen atom. Preferred examples of the relevant alkyl group, amino group and halogen atom are the same as the preferred ranges of the alkyl group, amino group and halogen atom defined by the group of substituents Z described below. l1 representing the number of $R^3$ is an integer from 0 to 4.

$R^4$, $R^5$ $R^4$ and $R^5$ each represent an alkyl group or a halogen atom, or represent groups that are linked to each other to form a ring together with $X^2$. Preferred ranges of the relevant alkyl group and halogen atom are the same as the preferred ranges of the alkyl group and halogen atom defined by the group of substituents Z described below. There are no particular limitations on the structure to which $R^4$ and $R^5$ are linked, but the structure is preferably a single bond, —O—, or —S—. m1 and n1 representing the numbers of $R^4$ and $R^5$ are integers from 0 to 4.

When $R^4$ and $R^5$ are alkyl groups, the alkyl group is preferably a methyl group or an ethyl group, and trifluoromethyl is also preferred.

$R^6$, $R^7$, $R^8$ $R^6$, $R^7$ and $R^8$ each represent a substituent. Herein, $R^7$ and $R^8$ may be linked to each other to form a ring. l2, m2, and n2 representing the numbers of the relevant substituents are integers from 0 to 4, and the integers preferably from 0 to 2, and more preferably from 0 to 1.

$J^1$ $J^1$ represents a single bond or a divalent linking group. The linking group represents *—COO$^-$N$^+$R$^b$R$^c$R$^d$—** (wherein $R^b$ to $R^d$ each represent a hydrogen atom, an alkyl group, or an aryl group, and preferred ranges thereof are the same as the ranges disclosed by the group of substituents Z described below), *—SO$_3^-$N$^+$R$^e$R$^f$R$^g$—** (wherein $R^e$ to $R^g$ each represent a hydrogen atom, an alkyl group, or an aryl group, and preferred ranges thereof are the same as the ranges disclosed by the group of substituents Z described below), an alkylene group, or an arylene group. * represents the bonding site on the phenylene group; and ** represents the bonding site on the opposite side. $J^1$ is preferably a single bond, a methylene group, or a phenylene group, and a single bond is particularly preferred.

$A^1$ $A^1$ represents a group selected from —COOH, —OH, —SH, —S(═O)$_2$R', and —S(═O)$_2$OH; and R' represents an alkyl group. A preferred range of the relevant alkyl group is the same as the preferred range of the alkyl group explained by the group of substituents Z described below. $A^1$ is preferably —COOH or —OH.

Substituent group Z includes:

an alkyl group (preferably an alkyl group having 1 to 30 carbon atoms, more preferably an alkyl group having 1 to 20 carbon atoms, and particularly preferably an alkyl group having 1 to 10 carbon atoms, and examples thereof include methyl, ethyl, iso-propyl, tert-butyl, n-octyl, n-decyl, and n-hexadecyl), a cycloalkyl group (preferably a cycloalkyl group having 3 to 30 carbon atoms, more preferably a cycloalkyl group having 3 to 20 carbon atoms, and particularly preferably a cycloalkyl group having 3 to 10 carbon atoms, and examples thereof include cyclopropyl, cyclopentyl, and cyclohexyl), an alkenyl group (preferably an alkenyl group having 2 to 30 carbon atoms, more preferably an alkenyl group having 2 to 20 carbon atoms, and particularly preferably an alkenyl group having 2 to 10 carbon atoms, and examples thereof include vinyl, allyl, 2-butenyl, and 3-pentenyl), an alkynyl group (preferably an alkynyl group having 2 to 30 carbon atoms, more preferably an alkynyl group having 2 to 20 carbon atoms, and particularly preferably an alkynyl group having 2 to 10 carbon atoms, and examples thereof include propargyl and 3-pentynyl), an aryl group (preferably an aryl group having 6 to 30 carbon atoms, more preferably an aryl group having 6 to 20 carbon atoms, and particularly preferably an aryl group having 6 to 12 carbon atoms, and examples thereof include phenyl, p-methylphenyl, naphthyl, and anthranyl), an amino group (including an amino group, an alkylamino group, an arylamino group, and a heterocyclic amino group; preferably an amino group having 0 to 30 carbon atoms, more preferably an amino group having 0 to 20 carbon atoms, and particularly preferably an amino group having 0 to 10 carbon atoms, and examples thereof include amino, methylamino, dimethylamino, diethylamino, dibenzylamino, diphenylamino, and ditolylamino), an alkoxy group (preferably an alkoxy group having 1 to 30 carbon atoms, more preferably an alkoxy group having 1 to 20 carbon atoms, and particularly preferably an alkoxy group having 1 to 10 carbon atoms, and examples thereof include methoxy, ethoxy, butoxy, and 2-ethylhexyloxy), an aryloxy group (preferably an aryloxy group having 6 to 30 carbon atoms, more preferably an aryloxy group having 6 to 20 carbon atoms, and particularly preferably an aryloxy group having 6 to 12 carbon atoms, and examples thereof include phenyloxy, 1-naphthyloxy, and 2-naphthyloxy), a heterocyclic oxy group (preferably a heterocyclic oxy group having 1 to 30 carbon atoms, more preferably a heterocyclic oxy group having 1 to 20 carbon atoms, and particularly preferably a heterocyclic oxy group having 1 to 12 carbon atoms, and examples thereof include pyridyloxy, pyrazyloxy, pyrimidyloxy, and quinolyloxy), an acyl group (preferably an acyl group having 1 to 30 carbon atoms, more preferably an acyl group having 1 to 20 carbon atoms, particularly preferably an acyl group having 1 to 12 carbon atoms, and examples thereof include acetyl, benzoyl, formyl, pivaloyl and the like), an alkoxycarbonyl group (preferably an alkoxycarbonyl group having 2 to 30 carbon atoms, more preferably an alkoxycarbonyl group having 2 to 20 carbon atoms, particularly preferably an alkoxycarbonyl group having 2 to 12 carbon atoms, and examples thereof include methoxycarbonyl, ethoxycarbonyl and the like), an aryloxycarbonyl group (preferably an aryloxycarbonyl group having 7 to 30 carbon atoms, more preferably an aryloxycarbonyl group having 7 to 20 carbon atoms, particularly preferably an aryloxycarbonyl group having 7 to 12 carbon atoms, and examples thereof include phenyloxycarbonyl and the like), an acyloxy group (preferably an acyloxy group having 2 to 30 carbon atoms, more preferably an acyloxy group having 2 to 20 carbon atoms, particularly preferably an acyloxy group having 2 to 10 carbon atoms, and examples thereof include acetoxy, benzoyloxy and the like), an acylamino group (preferably an acylamino group having 2 to 30 carbon atoms, more preferably an acylamino group having 2 to 20 carbon atoms, particularly preferably an acylamino group having 2 to 10 carbon atoms, and examples thereof include acetylamino, benzoylamino and the like), an alkoxycarbonylamino group (preferably an alkoxycarbonylamino group having 2 to 30 carbon atoms, more preferably an alkoxycarbonylamino group having 2 to 20 carbon atoms, particularly preferably an alkoxycarbonylamino group having 2 to 12 carbon atoms, and examples thereof include methoxycarbonylamino and the like), an aryloxycarbonylamino group (preferably an aryloxycarbonylamino group having 7 to 30 carbon atoms, more preferably an aryloxycarbonylamino group having 7 to 20 carbon atoms, particularly preferably an aryloxycarbonylamino group having 7 to 12 carbon atoms, and examples thereof include phenyloxycarbonylamino and the like), a sulfonylamino group (preferably a sulfonylamino group having 1 to 30 carbon atoms, more preferably a sulfonylamino group having 1 to 20 carbon atoms, particularly preferably a sulfonylamino group having 1 to 12 carbon atoms, and examples thereof include methanesulfonylamino, benzenesulfonylamino and the like), a sulfamoyl group (preferably a sulfamoyl group having 0 to 30 carbon atoms, more preferably a sulfamoyl group having 0 to 20 carbon atoms, particularly preferably a sulfamoyl group having 0 to 12 carbon atoms, and examples thereof include sulfamoyl, methylsulfamoyl, dimethylsulfamoyl, phenylsulfamoyl and the like), a carbamoyl group (preferably a carbamoyl group having 1 to 30 carbon atoms, more preferably a carbamoyl group having 1 to 20 carbon atoms, particularly preferably a carbamoyl group having 1 to 12 carbon atoms, and examples thereof include carbamoyl, methylcarbamoyl, diethylcarbamoyl, phenylcarbamoyl and the like), an alkylthio group (preferably an alkylthio group having 1 to 30 carbon atoms, more preferably an alkylthio group having 1 to 20 carbon atoms, particularly preferably an alkylthio group having 1 to 12 carbon atoms, and examples thereof include methylthio, ethylthio and the like), an arylthio group (preferably an arylthio group having 6 to 30 carbon atoms, more preferably an arylthio group having 6 to 20 carbon atoms, particularly preferably an arylthio group having 6 to 12 carbon atoms, and examples thereof include phenylthio and the like), a heterocyclic thio group (preferably a heterocyclic thio group having 1 to 30 carbon atoms, more preferably a heterocyclic thio group having 1 to 20 carbon atoms, particularly preferably a heterocyclic thio group having 1 to 12 carbon atoms, and examples thereof include pyridylthio, 2-benzimizolylthio, 2-benzoxazolylthio, 2-benzthiazolylthio and the like), a sulfonyl group (preferably a sulfonyl group having 1 to 30 carbon atoms, more preferably a sulfonyl group having 1 to 20 carbon atoms, particularly preferably a sulfonyl group having 1 to 12 carbon atoms, and examples thereof include mesyl, tosyl and the like), a sulfinyl group (preferably a sulfinyl group having 1 to 30 carbon atoms, more preferably a sulfinyl group having 1 to 20 carbon atoms, particularly preferably a sulfinyl group having 1 to 12 carbon atoms, and examples thereof include methanesulfinyl, benzenesulfinyl and the like), a ureido group (preferably a ureido group having 1 to 30 carbon atoms, more preferably a ureido group having 1 to 20 carbon atoms, particularly preferably a ureido group having 1 to 12 carbon atoms, and examples thereof include ureido, methylureido, phenylureido and the like), a phosphoric acid amide group (preferably a phosphoric acid amide group having 1 to 30 carbon atoms, more preferably a phosphoric acid amide group having 1 to 20 carbon atoms, particularly preferably a phosphoric acid amide group having 1 to 12 carbon atoms, and examples thereof include diethylphosphoric acid amide, phenylphosphoric acid amide and the like), a hydroxy group, a mercapto group, a halogen atom (for example, a fluorine atom, a chlorine atom, a bromine atom and an iodine atom, more preferably a fluorine atom), a cyano group, a sulfo group, a carboxy group, an oxo group, a nitro group, a hydroxamic acid group, a sulfino group, a hydrazino group, an imino group, a heterocyclic group (preferably a heterocyclic group having a 3-membered to 7-membered ring, and may be an aromatic heterocyclic ring or a non-aromatic heterocyclic ring; examples of the heteroatoms that constitute the heterocyclic ring include a nitrogen atom, an oxygen atom, and a sulfur atom. The heterocyclic group is preferably a heterocyclic group having 0 to 30 carbon atoms, and more preferably a heterocyclic group having 1 to 12 carbon atoms, and specific examples thereof include imidazolyl, pyridyl, quinolyl, furyl, thienyl, piperidyl, morpholino, benzoxazolyl, benzimidazolyl, benzothiazolyl, carbazolyl, and azepinyl), a silyl group (preferably a silyl group having 3 to 40 carbon atoms, more preferably a silyl group having 3 to 30 carbon atoms, and particularly preferably a silyl group having 3 to 24 carbon atoms, and examples thereof include trimethylsilyl and triphenylsilyl), and a silyloxy group (preferably a silyloxy group having 3 to 40 carbon atoms, more preferably a silyloxy group having 3 to 30 carbon atoms, and particularly preferably a silyloxy group having 3 to 24 carbon atoms, and examples thereof include trimethylsilyloxy and triphenylsilyloxy). These substituents may be further substituted by one or more substituents selected from the substituent group Z.

Herein, in the present invention, when one structural site has a plurality of substituents, those substituents may be linked with each other to form a ring, or may be subjected to ring condensation partially or wholly with the above-described structural site to form an aromatic ring or an unsaturated heterocycle.

The molecular weight of the PBO resin that can be used in the present invention is, as the mass average molecular weight, preferably 10,000 to 1,000,000, more preferably 15,000 to 500,000, even more preferably 20,000 to 300,000, and still more preferably 25,000 to 200,000.

Unless specified otherwise, the molecular weight and the degree of dispersion are defined as the values obtained by measurement in accordance with a GPC (gel permeation chromatography). The molecular weight is defined as polystyrene-converted mass-average molecular weight. The gel charged into the column to be used in the GPC method is preferably a gel having an aromatic compound as a repeating unit, and examples thereof include a gel made of styrene-divinylbenzene copolymers. The column is preferably used in the form where 2 to 6 columns are connected. Examples of a solvent to be used include ether-based solvents, such as tetrahydrofuran, and amide-based solvents, such as N-methylpyrrolidinone. The measurement is preferably carried out at a flow rate of the solvent in the range of from 0.1 to 2 mL/min, and most preferably in the range of from 0.5 to 1.5 mL/min. By carrying out the measurement within these ranges, there is no occurrence of loading in an apparatus, and thus, the measurement can be carried out further efficiently. The measurement temperature is preferably carried out at from 10° C. to 50° C., and most preferably from 20° C. to 40° C. A column and a carrier to be used can be properly selected, according to the property of a polymer compound to be measured.

<Synthesis of Polybenzoxazole Resin>

The PBO resin that can be used in the present invention can be synthesized in a usual manner. In order to realize high solubility to a low-boiling-point solvent, it is preferable to synthesize the PBO resin at a temperature of 250° C. or lower, and preferably 200° C. or lower. That is, it is preferable that any thermal rearrangement or any decarboxylation step is not included in the synthetic reaction. By the above, the synthesis of the PBO resin in the present invention is preferably carried out in a solution. A PBO membrane obtained by producing a membrane of a PBO precursor and then condensing this precursor membrane is not suitable as the gas separating layer in the present invention. A PBO membrane obtained by producing a membrane of a PBO precursor and then condensing this precursor membrane, has low solubility to a low-boiling-point solvent, and since the membrane is exposed to a high temperature, there is a disadvantage that the membrane is apt to be deteriorated. That is, a PBO membrane that constitutes the gas separating layer in the present invention has superior gas separation performance and superior membrane strength, as compared with a PBO membrane obtained by producing a membrane of a PBO precursor and then condensing this precursor membrane. The synthesis of the PBO resin that can be used in the present invention is usually synthesized at a temperature of 50° C. or higher. More specifically, there are available a method of using a bisaminophenol and a dicarboxylic acid as raw materials, and condensing the raw materials with polyphosphoric acid or Eaton's reagent; and a method of performing condensation using an aminophenol and an acid chloride, a silylated aminophenol and an acid chloride, an aminophenol and an aldehyde, or an aminophenol and a nitrile, as raw materials. Also, synthesis can also be carried out by polymerization by etherification of a benzoxazole having a fluorine substituent and bisphenol, or by polymerization by Suzuki-Miyaura coupling between a benzoxazole having a bromo group and diboronic acid.

Examples of the PBO resin that can be used in the present invention include polymers including the repeating units described below, but the present invention is not intended to be limited to these. X and Y assigned to repeating units each are the numbers of representing the existence ratios (molar ratios) of the various repeating units in the PBO, and they are not intended to represent the numbers of various repeating units connected in sequence. The ratio X:Y is preferably 10:90 to 90:10. Also, Me represents methyl.

-continued

Polymer-08

Polymer-09

Polymer-10

Polymer-11

Polymer-12

[Other Components and the Like]

The gas separation membrane of the present invention may contain a variety of polymer compounds, in order to adjust membrane physical properties. Examples of the polymer compounds include acrylic polymers, polyurethane resins, polyamide resins, polyester resins, epoxy resins, phenol resins, polycarbonate resins, polyvinyl butyral resins, polyvinyl formal resins, shelac, vinylic resins, acrylic resins, rubber-based resins, waxes, and other natural resins. These polymer compounds may be used alone or in combination of two or more kinds thereof.

Moreover, a nonionic surfactant, a cationic surfactant, an organic fluoro surfactant (compound) or the like may be added, in order to adjust liquid physical properties.

Specific examples of the surfactant include anionic surfactants, such as alkylbenzene sulfonates, alkyl naphthalene sulfonates, higher fatty acid salts, sulfonates of a higher fatty acid ester, ester sulfates of a higher alcohol ether, sulfonates of a higher alcohol ether, alkylcarboxylates of a higher alkylsulfone amide, and alkylphosphates; and nonionic surfactants, such as polyoxyethylene alkyl ethers, polyoxyethylene alkyl phenyl ethers, polyoxyethylene fatty acid esters, sorbitan fatty acid esters, ethylene oxide adducts of acetylene glycol, ethylene oxide adducts of glycerin, and polyoxyethylene sorbitan fatty acid esters. Other examples include amphoteric surfactants, such as alkyl betaine or amide betaine; silicone-based surfactants; fluorine-based surfactants and the like. The surfactant may be suitably selected from conventionally known surfactants and derivatives thereof.

Specific examples of polymer dispersants include polyvinyl pyrrolidone, polyvinyl alcohol, polyvinyl methylether, polyethylene oxide, polyethylene glycol, polypropylene glycol, and polyacryl amide. Among them, polyvinyl pyrrolidone is preferably used.

The conditions to form the gas separation membrane of the present invention are not particularly limited, but the temperature is preferably from −30° C. to 100° C., more preferably from −10° C. to 80° C., and particularly preferably from 5° C. to 50° C.

In the present invention, gas, such as the air or oxygen, may coexist in the formation of membrane, but the formation is preferably performed under an inert gas atmosphere.

[Method of Separating Gas Mixture]

The method of separating a gas of the present invention is a method including selectively causing carbon dioxide to permeate from a mixed gas containing carbon dioxide and methane. The pressure at the time of gas separation is preferably 10 to 100 atmospheres, and more preferably 20 to 70 atmospheres. Furthermore, the gas separation temperature is preferably −30° C. to 90° C., and more preferably 15° C. to 70° C.

[Gas Separation Module and Gas Separation Apparatus]

The gas separation membrane of the present invention is a composite membrane combined with a porous support, and a gas separation module can be produced using this composite membrane. Examples of the module include a spiral type module, a hollow fiber type module, a pleat type module, a tubular type module, and a plate and frame type module.

Furthermore, a gas separation apparatus having a means for separation and collection or separation and purification of a gas can be obtained, by using the gas separation composite membrane or the gas separation membrane module of the present invention. Moreover, the gas separation composite membrane of the present invention may be applied to an apparatus for separating and recovering gas using a membrane/absorption hybrid method in conjunction with an absorption solution, for example, as described in JP-A-2007-297605.

EXAMPLES

Hereinafter, the present invention will be described in more detail with reference to examples, but the invention is not limited to these examples.

Synthetic Example

Synthesis of Polymer

In a 200-mL three-necked flask, 600 mL of Eaton's reagent, 23.34 g (63.7 mmol) of BIS-AP-AF (manufactured by Central Glass), and 25.00 g (63.7 mmol) of BIS-B-AF (manufactured by Central Glass) were introduced, and the mixture was stirred for 2 hours at 80° C. under a nitrogen gas stream, followed by stirring for 6 hours at 150° C. Then, the reaction solution was cooled to room temperature and then was poured to 2 L of water to induce reprecipitation. The precipitate was washed with water and methanol, and was dried by blowing the air at 80° C. Thus, 42 g of a polymer (Polymer-01, mass average molecular weight: 162,000) was obtained.

BIS-AP-AF

BIS-B-AF

Similarly, the polymers indicated in Table 1 were synthesized. In the Polymers-02, -05, -06, -07, -10, -11, and -12 thus synthesized, the ratios of X:Y in the various formulas were set to 50:50, 20:80, 80:20, 20:80, 20:80, 30:70, and 20:80, respectively. The ratios are molar ratios.

[Example 1] Production of Composite Membrane

In a 30-ml brown vial, 1.4 g of a polymer (Polymer-01) and 8.6 g of methyl ethyl ketone were mixed, and the mixture was stirred for 30 minutes. Then, to the mixture, 28 mg of 1-hydroxycyclohexyl phenyl ketone (manufactured by Sigma-Aldrich, product name: 40,561-2) was further added, and the resultant mixture was stirred for 30 minutes. A polyacrylonitrile porous membrane (manufactured by GMT Membrantechnik GmbH) was placed on a clean glass plate which measured 10 cm on all of the four sides, and the above polymer liquid was cast on the surface of the porous support using an applicator. Thus, a composite membrane (Example 1) was obtained. The thickness of the polymer (Polymer-01) layer was about 1 μM, and the thickness of the polyacrylonitrile porous membrane including a nonwoven fabric was about 180 μm.

Meanwhile, regarding the cut-off molecular weight of this polyacrylonitrile porous membrane, a membrane having a cut-off molecular weight of 100,000 or less was used.

[Examples 2 to 12] Production of Composite Membranes

Composite membranes of Examples 2 to 12 as indicated in Table 1 were produced by changing the polymer used in Example 1 to the respective polymer, as indicated in Table 1.

[Comparative Example 1] Production of Composite Membrane

A PBO was synthesized from 6FDA (Daikin Industries) and BIS-AP-AF (Central Glass) as raw materials, through a thermal rearrangement process, according to the method described in Science 2007, 318, 254-258. The PBO thus obtained had low solubility to a low-boiling-point solvent, and it was not possible to produce a composite membrane by preparing a coating liquid of the PBO.

[Comparative Example 2] Production of Single Membrane

A single membrane of PBO was produced from 6FDA (Daikin Industries) and BIS-AP-AF (Central Glass) as raw materials, according to the method described in Science 2007, 318, 254-258. The membrane thickness of this single membrane was 30 μm.

[Test Example 1] Evaluation of Membrane Formability

<Evaluation of Solubility>

In a step of applying and forming a separating layer of a gas separation membrane, solubility of the polymer to a low-boiling-point solvent becomes important. Thus, the polymer was dissolved at a temperature of 30° C. using tetrahydrofuran (THF), which is generally used when performing application and film formation, and solubility of the polymer was investigated.

<Evaluation of Membrane Thickness>

If the separating layer of the gas separation membrane can be formed into a thin layer, high gas permeation performance can be obtained. In order to investigate the precision of thickness reduction of the separating layer, ten sites of the membrane thickness measurement sites were randomly selected in a separating layer that constitutes the gas separation membrane, membrane thickness measurement was carried out at the relevant sites, to evaluate the membrane thickness distribution.

(Evaluation criteria)

A: The membrane thicknesses at the ten sites were all 0.05 to 0.3 µm.

B: The criterion A is not applicable, but the membrane thicknesses at the ten sites were all 0.01 to 1.0 µm.

C: The criteria A and B are not applicable.

[Test Example 2] Sample Error Ratio

Fifty samples each of the gas separation membranes described in Examples 1 to 12 and Comparative Example 2 described above were produced, and the permeability of hydrogen was measured with the samples. A sample having a gas permeability value of more than $1 \times 10^6$ ml/m²·24 h·atm was considered as a membrane having pinholes (sample error), and the sample error ratio was determined.

A: Error ratio of 5% or less

B: Error ratio of 5% or more but less than 10%

C: Error ratio of 10% or more

[Test Example 3] Measurement of Gas Permeance

<Evaluation of Gas Separation Performance>

In regard to the composite membrane or single membrane thus obtained, the permeability of the respective gases of carbon dioxide ($CO_2$) and methane ($CH_4$) was measured by TCD detecting type gas chromatography at 35° C., and a total pressure on the gas supply side would be 5 atmospheres (partial pressure of $CO_2$ and $CH_4$: 2.5 atmospheres), using a stainless steel cell made of SUS316 having resistance to high pressure (manufactured by Denissen) and using a mass flow controller such that the volume ratio of $CO_2$ and $CH_4$ would be 1:1. A comparison of the gas permeability of the membranes was made by calculating the gas permeance. The unit of the gas permeance is expressed in GPU unit (1 GPU=$1 \times 10^{-6}$ cm³ (STP)/(s·cm²·cmHg)).

<Heat and Humidity Aging Test>

The gas separation membranes produced in Examples and Comparative Examples were stored for 24 hours under the conditions of 80° C. and a humidity of 90% (low temperature thermo-hygrostat manufactured by Isuzu Seisakusho, crystal), and then the gas separation performance was evaluated as described above.

<Toluene Exposure Test>

Toluene solvent was introduced into a 100-ml beaker, and the beaker was placed in a glass container that could be sealed with a stretchable lid. The gas separation composite membranes produced in one of Examples and Comparative Examples were also placed in the beaker, and the beakers were covered with glass lids, to provide a tightly sealed system. Then, the membranes were stored for 24 hours under the conditions of 40° C., and the gas separation performance was evaluated as described above.

[Test Example 4] Bending Test

The gas separation membrane according to the present invention is desirably used as a package referred to as a module or an element in which the membrane is packed. When the gas separation membrane is used as the module, the membranes are packed with high density in order to increase a membrane surface area. In a flat sheet membrane, it should be packed by bending the membranes in a spiral shape, thus sufficient bending strength should be provided with the membrane. In order to confirm the performance, operations of bending each composite membrane at 180 degrees and unbending the membrane were repeated by 50 times, and then whether or not measurement of the gas permeability was changed was confirmed.

(Evaluation Criteria)

A: The permeance to methane gas almost did not change before and after bending.

B: The permeance to methane gas obviously increased after bending.

The results of the test examples described above are presented in Table 1.

TABLE 1

|  | Polymer | Mass average molecular weight | Solubility (mass %) | Membrane thickness | Sample error ratio |
|---|---|---|---|---|---|
| Example 1 | Polymer-01 | 162,000 | 1 or more | A | A |
| Example 2 | Polymer-02 | 134,000 | 1 or more | A | B |
| Example 3 | Polymer-03 | 89,000 | 1 or more | A | A |
| Example 4 | Polymer-04 | 31,000 | 1 or more | A | A |
| Example 5 | Polymer-05 | 75,000 | 1 or more | A | A |
| Example 6 | Polymer-06 | 25,000 | 1 or more | A | A |
| Example 7 | Polymer-07 | 125,000 | 1 or more | A | A |
| Example 8 | Polymer-08 | 113,000 | 1 or more | A | A |
| Example 9 | Polymer-09 | 250,000 | 1 or more | A | A |
| Example 10 | Polymer-10 | 51,000 | 1 or more | A | A |
| Example 11 | Polymer-11 | 49,100 | 1 or more | A | B |
| Example 12 | Polymer-12 | 89,000 | 1 or more | A | A |
| Comparative Example 1 | Polymer-01 (Thermal rearrangement) | Impossible to measure | Less than 0.2 | — | — |
| Comparative Example 2 | Polymer-01 (Thermal rearrangement) | Impossible to measure | Less than 0.2 | C | B |

TABLE 1-continued

|  | Folding test | $CO_2$ permeance (GPU) | $R_{CO2}/R_{CH4}$ selectivity | | |
|---|---|---|---|---|---|
|  |  |  | Untreated | Heat and humidity aging | Toluene exposure |
| Example 1 | A | 95 | 36 | 32 | 30 |
| Example 2 | A | 54 | 39 | 35 | 34 |
| Example 3 | A | 70 | 38 | 34 | 34 |
| Example 4 | A | 88 | 42 | 41 | 40 |
| Example 5 | A | 75 | 33 | 30 | 29 |
| Example 6 | A | 88 | 29 | 27 | 25 |
| Example 7 | A | 76 | 35 | 32 | 30 |
| Example 8 | A | 89 | 29 | 27 | 25 |
| Example 9 | A | 47 | 44 | 41 | 40 |
| Example 10 | A | 49 | 45 | 42 | 42 |
| Example 11 | A | 45 | 42 | 38 | 36 |
| Example 12 | A | 46 | 43 | 40 | 39 |
| Comparative Example 1 | — | — | — | — | — |
| Comparative Example 2 | B | 20 | 20 | 18 | 16 |

From the results in Table 1, it can be seen that a PBO synthesized at a low temperature of about 150° C. without using a thermal rearrangement reaction exhibits high solubility of 1% by mass or more to a low-boiling-point solvent, at a temperature of 30° C. It was also found that when this highly soluble PBO is used, the gas separating layer can be formed into a thin layer. The solubility described in Table 1 is directed to tetrahydrofuran; however, the PBO also exhibited a solubility of 1% by mass or more, at a temperature of 30° C., similarly in chloroform, methyl ethyl ketone, and N-methylpyrrolidone, which are generally used as a solvent for a coating liquid for forming a gas separating layer.

Furthermore, a gas separation membrane having such a gas separating layer has excellent selective permeability for carbon dioxide, and is suitable as a separation membrane for carbon dioxide/methane, despite that a PBO synthesized through a thermal rearrangement reaction at a high temperature is not used. Furthermore, it was also found that the gas separation membrane has excellent stability in wet heat aging or in the co-presence of toluene, and exhibits stabilized performance over a long time period.

From the above results, it was found that by using the gas separation membrane of the present invention, an excellent gas separation method, a gas separation module, a gas separation apparatus having the gas separation module, and a method of producing a gas separation composite membrane, can be provided.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 Gas separating layer
2 Porous layer
3 Nonwoven fabric layer
10 and 20 Gas separation composite membrane

The invention claimed is:

1. A gas separation membrane having a gas separating layer containing a polybenzoxazole resin, in which the polybenzoxazole exhibits a solubility of 1% by mass or more to any one solvent selected from tetrahydrofuran, chloroform, methyl ethyl ketone, and N-methylpyrrolidone, at a temperature of 30° C., wherein the gas separating layer is formed using a solution of the polybenzoxazole resin, and the polybenzoxazole resin has a repeating unit represented by the following formula (I)

wherein, in formula (I), $R^a$ represents a group having a structure represented by any one of the following formulas (I-a) to (I-d); $X^1$ represents a single bond or a divalent linking group; $R^1$ and $R^2$ each represent a hydrogen atom or an alkyl group; and symbol * represents a bonding site with N or O indicated in formula (I), -continued (I-d)

wherein, in formula (I), $R^b$ represents any one of the following formulas (II-a), (II-b), (III-a) and (III-b), Formula (II-a)

Formula (II-b)

wherein $R^3$ represents an alkyl group, an amino group, or a halogen atom; $R^4$ and $R^5$ each represent an alkyl group or a halogen atom, or are linked to each other to represent a ring-forming group together with $X^2$; l1, m1 and n1 each represent an integer from 0 to 4; and $X^2$ represents a single bond or a divalent linking group selected from the group consisting of —C($R^x$)$_2$— (wherein $R^x$ represents a hydrogen atom or a substituent; when $R^x$ is a substituent, these substituents may be linked to each other to form a ring), —SO$_2$—, —C(=O)—, —S—, —NR$^Y$— (wherein $R^Y$ represents a hydrogen atom, an alkyl group, or an aryl group), or a combination thereof, Formula (III-a)

Formula (III-b)

wherein $R^6$, $R^7$, and $R^8$ each represent a substituent; $J^1$ represents a single bond or a divalent linking group; l2, m2, and n2 each represent an integer from 0 to 3; $A^1$ represents a group selected from —COOH, —OH, —SH, —S(=O)$_2$R', and —S(=O)$_2$OH; R' represents an alkyl group; and $X^3$ represents a single bond or a divalent linking group.

2. The gas separation membrane according to claim 1, wherein the gas separation membrane is a gas separation composite membrane having the gas separating layer above a gas permeable supporting layer.

3. The gas separation membrane according to claim 1, wherein in the case where the gas to be subjected to separation is a mixed gas of carbon dioxide and methane, a permeation rate of carbon dioxide at 35° C. and 5 atmospheres is more than 20 GPU, and a ratio of the permeation rates of carbon dioxide and methane ($R_{CO2}/R_{CH4}$) is 15 or higher.

4. The gas separation membrane according to claim 2, wherein the supporting layer includes a porous layer on the gas separating layer side and a nonwoven fabric layer on the opposite side.

5. The gas separation membrane according to claim 4, wherein a cut-off molecular weight of the porous layer is 100,000 or less.

6. The gas separation membrane according to claim 1, wherein the gas separation membrane is used to selectively permeate carbon dioxide from a gas containing carbon dioxide and methane.

7. A gas separation module having the gas separation membrane according to claim 1.

8. A gas separation apparatus having the gas separation module according to claim 7.

9. A method of separating a gas, the method containing selectively causing carbon dioxide to permeate from a gas containing carbon dioxide and methane, using the gas separation membrane according to claim 1.

* * * * *